(12) United States Patent
Xiao (10) Patent No.: US 9,678,593 B2
(45) Date of Patent: Jun. 13, 2017

(54) GATE ON ARRAY CIRCUIT APPLIED TO LIQUID CRYSTAL DISPLAY DEVICE

(71) Applicant: SHENZHEN CHINA STAR OPTOELECTRONICS TECHNOLOGY CO., LTD., Guangdong (CN)

(72) Inventor: Juncheng Xiao, Guangdong (CN)

(73) Assignee: SHENZHEN CHINA STAR OPTOELECTRONICS TECHNOLOGY CO., Guangdong (CN)

(*) Notice: Subject to any disclaimer, the term of this patent is extended or adjusted under 35 U.S.C. 154(b) by 95 days.

(21) Appl. No.: 14/417,978

(22) PCT Filed: Jan. 7, 2015

(86) PCT No.: PCT/CN2015/070263
§ 371 (c)(1),
(2) Date: Jan. 28, 2015

(87) PCT Pub. No.: WO2016/106795
PCT Pub. Date: Jul. 7, 2016

(65) Prior Publication Data
US 2016/0188074 A1    Jun. 30, 2016

(30) Foreign Application Priority Data
Dec. 31, 2014  (CN) .......................... 2014 1 0851761

(51) Int. Cl.
G09G 3/36    (2006.01)
G06F 3/041   (2006.01)
G06F 3/044   (2006.01)

(52) U.S. Cl.
CPC .......... *G06F 3/0416* (2013.01); *G06F 3/0412* (2013.01); *G06F 3/044* (2013.01)

(58) Field of Classification Search
CPC ....... G06F 3/0416; G06F 3/0412; G06F 3/044
See application file for complete search history.

(56) References Cited

U.S. PATENT DOCUMENTS

2004/0257303 A1* 12/2004 Fujita ...................... G09G 3/006
                                                            345/51
2015/0054781 A1*  2/2015 Miyamoto .............. G06F 3/044
                                                            345/174

(Continued)

*Primary Examiner* — Kwang-Su Yang
(74) *Attorney, Agent, or Firm* — WPAT, P.C., Intellectual Property Attorneys; Anthony King (57) ABSTRACT

A GOA (Gate On Array) circuit applied to a liquid crystal display device is disclosed. The liquid crystal display device has a plurality of scan lines. The GOA circuit has a plurality of cascaded GOA units. An (N)th level GOA unit is controlled to charge an (N)th level scanning line accordingly. The (N)th level GOA unit includes a signal transfer circuit, an inverting amplifier circuit, a signal reset circuit, and an inverting logistic circuit. Processing a first screen scanning procedure, the GOA circuit will forward scan from the 1st level GOA unit to the (N)th level GOA unit, while the GOA circuit receives a touch signal, the GOA circuit enters into a touch point scanning procedure, then entering into a second screen scanning procedure. This improves the format of touch scanning and increases the report rate of the touch panel to improve the sensitivity of the touch panel.

8 Claims, 6 Drawing Sheets

(56) References Cited

U.S. PATENT DOCUMENTS

2015/0243237 A1* 8/2015 Li .................... G11C 19/184
            345/100
2016/0049126 A1* 2/2016 Zhang ................ G09G 3/3648
            345/173

* cited by examiner

GATE ON ARRAY CIRCUIT APPLIED TO LIQUID CRYSTAL DISPLAY DEVICE

BACKGROUND OF THE INVENTION

Field of Invention

The present invention relates to the field of liquid crystal display technology, and more particularly to a liquid crystal display for a GOA (Gate Driver on Array, an array substrate row driver) circuit based on LTPS (Low-Temperature Poly-Si) CMOS (Complementary Metal Oxide Semiconductor).

Description of Prior Art

Touch panels have been widely applied in smart phones, tablets/electronic books, electronic notebooks, POS (point of sale)/KIOSKs, game consoles, and ATMs. In the future, the number of touch panels will quickly increase, especially in cell phones, tablets, portable media players (PMP/MP3), personal pilot devices, and other applications. Meanwhile, touch panels will have a chance to break out and grow into large-size-screen applications such as All-In-One computers.

According to an output volume of touch panels, mobile phones are the most important field (where ⅔ touch panels are applied), especially with the perfervid competition of cost-concerned market and the demand for high quality products, an in-cell touch technology has been grown. For touch technology, the report rate is an important index; the report rate generally needs to be higher than a specific number (60) to pass a technical request. The format of scanning decides the report rate which influences the sensitivity of the touch panel directly. However, the format of scanning is limited by the time limit of the frame rate and the gate scanning driving format.

Usually, for touch technology, the formats of driving electrodes (Tx) are divided into two kinds. One is to scan the driving electrodes at the blanking time after the display image has scanned; however, take display devices with 60 Hz, the time for scanning the driving electrodes is less than 4 ms.

Another format is to scan the driving electrodes at the gaps between the output gate signals during the column scanning procedure. In order to avoid the interference of the signals of the driving electrodes caused by the data signal, a scanning of the driving electrodes needs to be done at the flat region of the data signal. For a high resolution product, the time required for the scan is extremely short, the width of each signal of the driving electrode is less than 2 us. The time is too short to accomplish the scanning of the driving electrodes, especially while trying to coordinate the touch technology with a normal display driving method, which is a large scanning limit to the touch technology. This makes a 120 Hz or higher scanning format report rate hard to accomplish. Thus, the report rate will be lower than the limit of this format.

For medium and small display devices, especially for LTPS products which are applied with the GOA design, GOA, which is using the existing array process of TFT (Thin Film Transistor) liquid crystal display to manufacture the gate scanning signal circuits on the array substrates. The GOA is a technology to accomplish the cascade scanning on gate electrodes. For the issue of panel power consumption, CMOS circuit design is applied in most of the manufacture processes of LTPS in the industry.

The present invention provides a CMOS gate driving circuit based on LTPS, with scanning circuit structure and scanning format, in order to improve the format of touch scanning, increase the report rate of a touch panel, and to improve the sensitivity of the touch panel.

SUMMARY OF THE INVENTION

An objective of the present invention is to provide a liquid crystal display for a GOA circuit based on LTPS PMOS.

To achieve the above objective, the present invention provides a GOA circuit applied to a liquid crystal display device, the liquid display device comprises a plurality of scanning lines. The GOA circuit comprises a plurality of cascaded GOA units, wherein an (N)th level GOA unit is controlled to charge an (N)th level scanning line accordingly. The (N)th level GOA unit comprises a signal transfer circuit, an inverting amplifier circuit, a signal reset circuit, and an inverting logistic circuit.

The signal transfer circuit is used to receive a rearward scanning signal and a forward scanning signal, and is connected with an (N−1)st gate signal point and an (N+1)st gate signal point.

The inverting amplifier circuit is connected with the signal transfer circuit and an (N)th gate signal point, and is used to receive a first clock signal. The signal reset circuit is connected with the inverting amplifier circuit and a constant high voltage, and is used to receive a reset signal. The inverting logistic circuit is connected with the signal reset circuit, the inverting amplifier circuit, the (N)th gate signal point, and the (N)th level scanning line.

When the first screen scanning procedure is processed, the GOA circuit scans from the 1st level GOA unit to the (X)th level GOA unit. When the GOA circuit receives the touch signal, a touch point scanning procedure is entered. When the reset signal is changed to a low potential, the second screen scanning procedure is entered.

In one embodiment, the touch point scanning procedure starts when the forward scanning signal is changed from a high potential to a low potential and the rearward scanning signal is changed from a low potential to a high potential, and ends when the reset signal is changed to a low potential. During the touch point scanning procedure, the liquid crystal display device processes a position confirmation procedure for the touch signal. In one embodiment, in the second screen scanning procedure, the GOA circuit scans rearward from the (M)th GOA unit to the (X+2) GOA unit, M is greater than or equal to (X+2).

In one embodiment, the signal transfer circuit comprises a first transmission gate and a second transmission gate. The first transmission gate comprises a first control terminal receiving the rearward scanning signal, a second control terminal receiving the forward scanning signal, and an input terminal being connected with the (N−1)st gate signal point. The second transmission gate comprises a first control terminal receiving the forward scanning signal, a second control terminal receiving the rearward scanning signal, an input terminal being connected with the (N+1)st gate signal point, and an output terminal being connected with an output terminal of the first transmission gate.

In one embodiment, the signal reset circuit comprises a first TFT, which comprises an output terminal connects with the output terminal of the second inverting amplifier, a control terminal receiving the reset signal, and the input terminal being connected with the high constant voltage.

In one embodiment, the inverting logistic circuit comprises a second inverter, an NAND gate, a third inverter, a fourth inverter, and a fifth inverter. The second inverter comprises an input terminal connects with the output terminal of the first TFT, and an output terminal connects with the (N)th gate signal point. The NAND gate comprises a first input terminal connects with the output terminal of the second inverter and the (N)th gate signal point, and a second input terminal receiving a second clock signal. The third inverter comprises an input terminal connects with an output terminal of the NAND gate. The fourth inverter comprises an input terminal connects with an output terminal of the third inverter. The fifth inverter comprises an input terminal connects with an output terminal of the fourth inverter, and an output terminal connects with the (N)th level scanning line.

In one embodiment, the first clock signal and the second clock signal are reverse signals of each other.

In one embodiment, the inverting amplifier circuit comprises a first inverting amplifier, a first inverter, and a second inverting amplifier. The first inverting amplifier comprises a first input terminal connects with the output terminal of the second transmission gate. The first inverter comprises an output terminal connects with a second input terminal of the first inverting amplifier, and an input terminal receiving the first clock signal. The second inverting amplifier comprises a output terminal connects with an output terminal of the first inverting amplifier, a first input terminal connects with the output terminal of the second transmission gate, a second input terminal receiving the first clock signal, and a third input terminal connects with a third input terminal of the first inverting amplifier and the (N)th gate signal point.

In one embodiment, the first transmission gate and the second transmission gate are CMOS.

To achieve the above objective, the present invention provides a GOA circuit applied to a liquid crystal display device, the liquid display device comprises a plurality of scanning lines. The GOA circuit comprises a plurality of cascaded GOA units, wherein an (N)th level GOA unit is controlled to charge an (N)th level scanning line accordingly. The (N)th level GOA unit comprises a forward-rearward scanning determining circuit, a signal transfer circuit, an inverting amplifier circuit, a signal reset circuit, and an inverting logistic circuit.

The forward-rearward scanning determining circuit, which is used to receive a rearward scanning signal, a forward scanning signal, a touch point forward scanning signal, and a touch point rearward scanning signal. The signal transfer circuit, which is used to receive the rearward scanning signal and the forward scanning signal, is connected with a (N−1)st gate signal point and an (N+1)st gate signal point. The inverting amplifier circuit is connected with the signal transfer circuit and an (N)th gate signal point, and is used to receive a first clock signal. The signal reset circuit is connected with the inverting amplifier circuit and a constant high voltage, and is used to receive a reset signal. The inverting logistic circuit is connected with the signal reset circuit, the inverting amplifier circuit, the (N)th gate signal point, and the (N)th level scanning line.

When the GOA circuit receives the touch signal, a touch point scanning procedure is entered. When the forward scanning signal is changed from a low potential to a high potential and the rearward scanning signal is changed from a high potential to a low potential, the second screen scanning procedure is entered.

In one embodiment, the touch point scanning procedure starts when the forward scanning signal is changed from a high potential to a low potential and the rearward scanning signal is changed from a low potential to a high potential, and ends when the forward scanning signal is changed back to the high potential and the rearward scanning signal is changed back to the low potential. During the touch point scanning procedure, the liquid crystal display device processes a position confirmation procedure for the touch signal.

In one embodiment, in the second screen scanning procedure, the GOA circuit scans rearward from the (M)th GOA unit to the (X+2) GOA unit, M is greater than or equal to (X+2).

In one embodiment, the inverting amplifier circuit comprises a first inverting amplifier, a first inverter, and a second inverting amplifier. The first inverting amplifier comprises a first input terminal being connected with the output terminal of the second transmission gate. The first inverter comprises an output terminal being connected with a second input terminal of the first inverting amplifier, and an input terminal receiving the first clock signal. The second inverting amplifier comprises a output terminal being connected with an output terminal of the first inverting amplifier, a first input terminal being connected with the output terminal of the second transmission gate, a second input terminal receiving the first clock signal, and a third input terminal being connected with a third input terminal of the first inverting amplifier and the (N)th gate signal point.

In one embodiment, the signal reset circuit comprises a first TFT, which comprises an output terminal being connected with the output terminal of the second inverting amplifier, a control terminal receiving the reset signal, and the input terminal being connected with the high constant voltage.

In one embodiment, the inverting logistic circuit comprises a second inverter, an NAND gate, a third inverter, a fourth inverter, and a fifth inverter. The second inverter comprises an input terminal being connected with the output terminal of the first TFT, and an output terminal being connected with the (N)th gate signal point. The NAND gate comprises a first input terminal being connected with the output terminal of the second inverter and the (N)th gate signal point, and a second input terminal receiving a second clock signal. The third inverter comprises an input terminal being connected with an output terminal of the NAND gate. The fourth inverter comprises an input terminal being connected with an output terminal of the third inverter. The fifth inverter comprises an input terminal being connected with an output terminal of the fourth inverter, and an output terminal being connected with (N)th level scanning line.

In one embodiment, the first clock signal and the second clock signal are reverse signals of each other.

In one embodiment, the signal transfer circuit comprises a first transmission gate and a second transmission gate. The first transmission gate comprises a first control terminal receiving the rearward scanning signal, a second control terminal receiving the forward scanning signal, and an input terminal being connected with the (N−1)st gate signal point. The second transmission gate comprises a first control terminal receiving the forward scanning signal, a second control terminal receiving the rearward scanning signal, an input terminal being connected with the (N+1)st gate signal point, and an output terminal being connected with an output terminal of the first transmission gate.

In one embodiment, the forward-rearward scanning determining circuit comprises a third transmission gate and a fourth transmission gate. The third transmission gate comprises a first control terminal receiving the rearward scanning signal, a second control terminal receiving the forward scanning signal, and an input terminal receiving the touch point forward scanning signal. The fourth transmission gate comprises a first control terminal receiving the forward scanning signal, a second control terminal receiving the rearward scanning signal, an input terminal receiving the touch point rearward scanning signal, and an output terminal being connected with an output terminal of the third transmission gate.

In one embodiment, the first to the fourth transmission gates are CMOS.

With the technical proposal of the present invention, the advantages are as follows:

1. With a method of a combination of a GOA circuit design based on LTPS PMOS and a touch point scanning, a desire for high report rate of the touch point is achieved, and the sensitivity of the touch point is increased.

2. With an area scanning, a multiple scanning of the touch point is achieved; 120 Hz or higher scanning frequency is achieved. The method is able to stop at a random position of a display area of the GOA circuit, start the touch point scanning, end the touch point scanning, the GOA circuit continues to scan from a next level circuit of the random position, after an output portion of the GOA circuit is finished, a second touch point scanning is continued. The method achieves an effect of 120 Hz within one frame.

3. With the amendment of the circuit structure, the limitations and pressures of touch panel electronic engineering are reduced, the manufacturing cost of ICs (integrated chips) are reduced, and the panel cost is reduced. Furthermore, with the combination of CMOS circuit design and the display of the touch point, the power consumption is effectively reduced, and the performance of the circuit is enforced.

DETAILED DESCRIPTION OF THE PREFERRED EMBODIMENTS

The following description of each embodiment, with reference to the accompanying drawings, is used to exemplify specific embodiments which may be carried out in the present invention. Directional terms mentioned in the present invention, such as "top", "bottom", "front", "back", "left", "right", "inside", "outside", "side", etc., are only used with reference to the orientation of the accompanying drawings. Therefore, the used directional terms are intended to illustrate, but not to limit, the present invention. In the drawings, units with similar structures are marked with the same labels.

Figure 1:
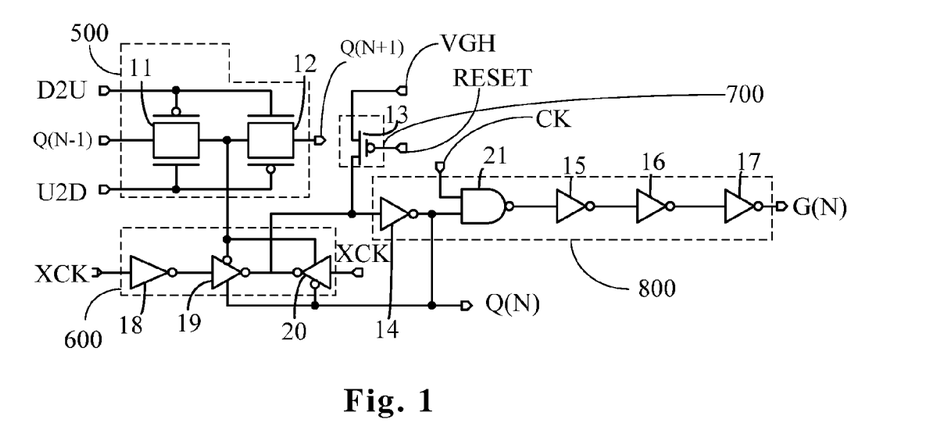
FIG. 1 is a circuit diagram of a GOA circuit according to a first embodiment of the present invention.

FIG. 1 is a circuit diagram of a GOA circuit according to a first embodiment of the present invention. The liquid display device comprises a plurality of scanning lines. The GOA circuit comprises a plurality of cascaded GOA units (100). An (N)th level GOA unit (100) is controlled to charge an (N)th level scanning line (G(N)) accordingly. The (N)th level GOA unit (G(N)) comprises a signal transfer circuit (500), an inverting amplifier circuit (600), a signal reset circuit (700), and an inverting logistic circuit (800). The signal transfer circuit (500) is used to receive a rearward scanning signal (D2U) and a forward scanning signal (U2D), and is connected with an (N−1)st gate signal point (Q(N−1)) and an (N+1)st gate signal point (Q(N+1)). The inverting amplifier circuit (600) is connected with the signal transfer circuit (500) and an (N)th gate signal point (Q(N)), and is used to receive a first clock signal (XCK). The signal reset circuit (700) is connected with the inverting amplifier circuit (600) and a constant high voltage (VGH), and is used to receive a reset signal (RESET). The inverting logistic circuit (800) is connected with the signal reset circuit (700), the inverting amplifier circuit (600), the (N)th gate signal point (Q(N)) and the (N)th level scanning line (G(N)).

The signal transfer circuit (500) comprises a first transmission gate (11) and a second transmission gate (12). The first transmission gate (11) comprises a first control terminal receiving the rearward scanning signal (D2U), a second control terminal receiving the forward scanning signal (U2D), and an input terminal being connected with the (N−1)st gate signal point (Q(N−1)). The second transmission gate (12) comprises a first control terminal receiving the forward scanning signal (U2D), a second control terminal receiving the rearward scanning signal (D2U), an input terminal being connected with the (N+1)st gate signal point Q(N+1)), and an output terminal being connected with an output terminal of the first transmission gate (11).

The first transmission gate (11) and the second transmission gate (12) are CMOS. The first control terminal of the CMOS is a gate electrode of a PMOS (P-channel metal-oxide semiconductor) of the CMOS, and the second control terminal of the CMOS is a gate electrode of an NMOS (N-channel metal-oxide semiconductor). The input terminal of the CMOS is a source electrode of the PMOS and the NMOS; the output terminal of the CMOS is a drain electrode of the PMOS and the NMOS.

The inverting amplifier circuit (600) comprises a first inverting amplifier (19), a first inverter (18), and a second inverting amplifier (20). The first inverting amplifier (19) comprises a first input terminal being connected with the output terminal of the second transmission gate (12). The first inverter (18) comprises an output terminal connected with a second input terminal of the first inverting amplifier (18), and an input terminal receiving the first clock signal (XCK). The second inverting amplifier (20) comprises a output terminal connected with an output terminal of the first inverting amplifier (18), a first input terminal connected with the output terminal of the second transmission gate (12), a second input terminal receiving the first clock signal (XCK), and a third input terminal connected with a third input terminal of the first inverting amplifier (18) and the (N)th gate signal point ((Q(N)).

The signal reset circuit (700) comprises a first TFT (13), which comprises an output terminal connected with the output terminal of the second inverting amplifier (20), a control terminal receiving the reset signal (RESET), and the input terminal connected with the high constant voltage (VGH). The first switch TFT (13) can be NMOS or PMOS, the input terminal of the first TFT is a source electrode, the output terminal of the first TFT is a drain electrode, and the control terminal of the first TFT is a gate electrode.

The inverting logistic circuit (800) comprises a second inverter (14), a NAND gate (21), a third inverter (15), a fourth inverter (16), and a fifth inverter (17). The second inverter (14) comprises an input terminal connected with the output terminal of the first TFT (13), and an output terminal connected with the (N)th gate signal point (Q(N)). The NAND gate (32) comprises a first input terminal connected with the output terminal of the second inverter (14) and the (N)th gate signal point (Q(N)), and a second input terminal receiving a second clock signal (CK). The third inverter (15) comprises an input terminal connected with an output terminal of the NAND gate (21). The fourth inverter (16) comprises an input terminal connected with an output terminal of the third inverter (15). The fifth inverter (17) comprises an input terminal connected with an output terminal of the fourth inverter (16), and an output terminal connected with (N)th level scanning line (G(N)). The first clock signal (XCK) and the second clock signal (CK) are reverse signals of each other.

In the embodiment of the present invention, with the transmission gates, inverters, NAND gate, and inverting amplifiers, the CMOS GOA driving circuit is constituted.

Figure 2:
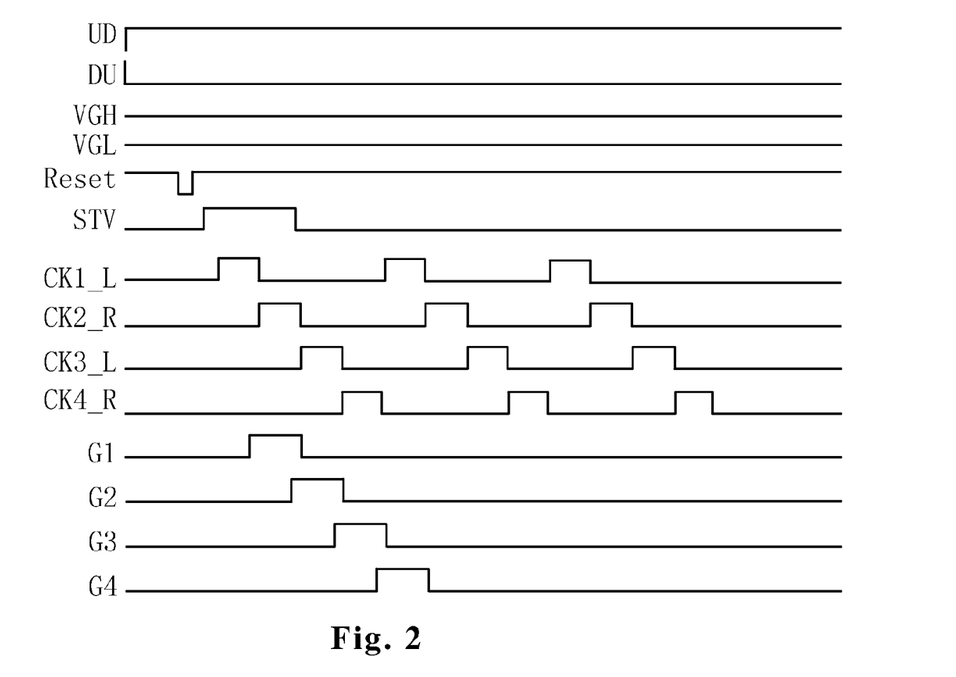
FIG. 2 is a pulse diagram of the GOA circuit during actual operation of the GOA circuit of FIG. 1.

FIG. 2 is a pulse diagram of the GOA circuit during actual operation of the GOA circuit of FIG. 1. For example, there are four second clock signals (CK1_L, CK2_R, CK3_L, CK4_R), which are used to control the four GOA units (100). The constant high voltage (VGH) and the constant low voltage (VGL) are used to provide a high potential and a low potential to the GOA circuit. The rearward scanning signal (D2U) and the forward scanning signal (U2D) are responsible for the forward scanning and the rearward scanning of the circuit. A starting impulse (STV) is used to initiate the scanning. According to the four second clock signals (CK1_L, CK2_R, CK3_L, CK4_R), the four GOA units (100) generate respectively four signals to four scanning lines (G1, G2, G3, G4).

Figure 3:
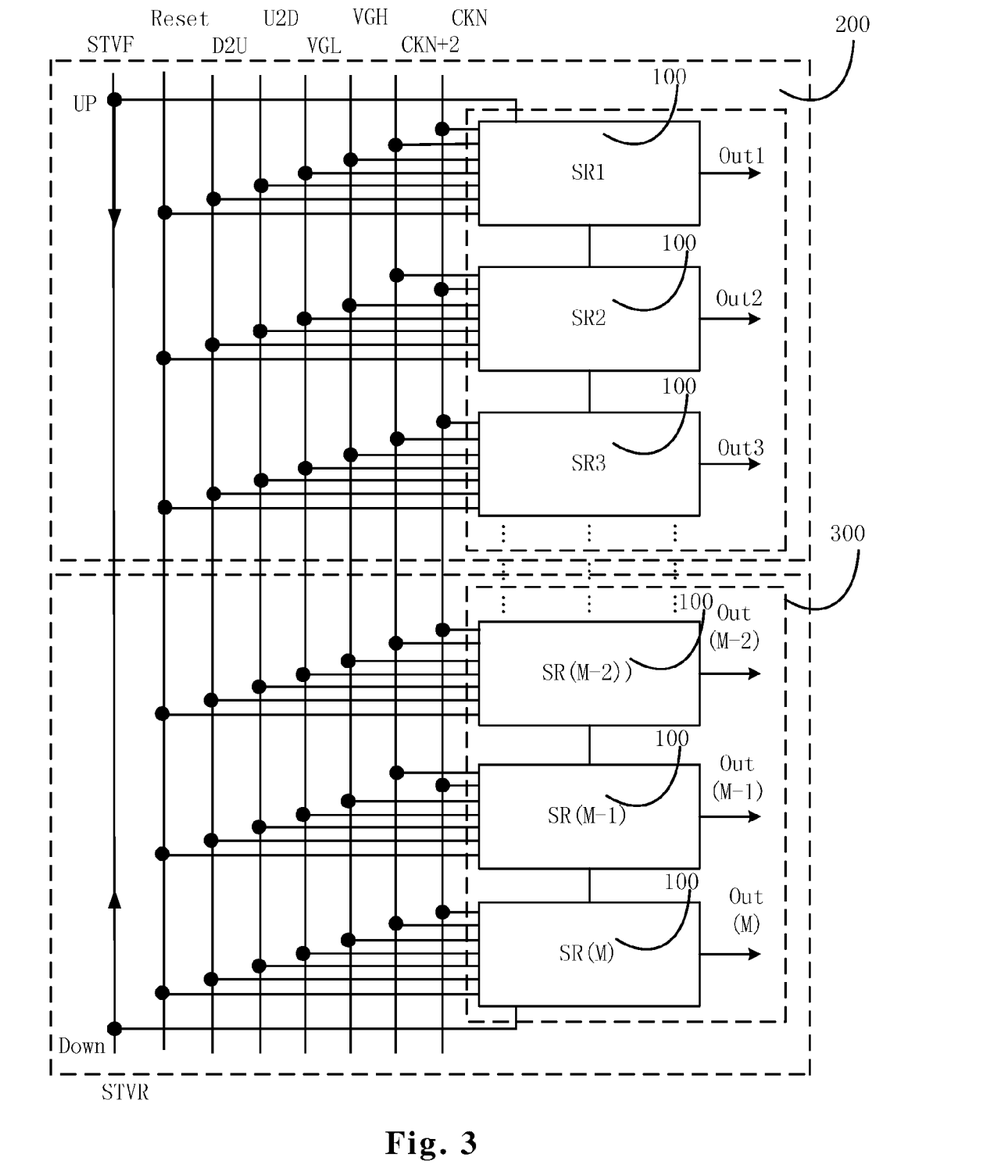
FIG. 3 is an illustrative drawing of the GOA circuit of the FIG. 1 in a liquid display device.
Figure 4:
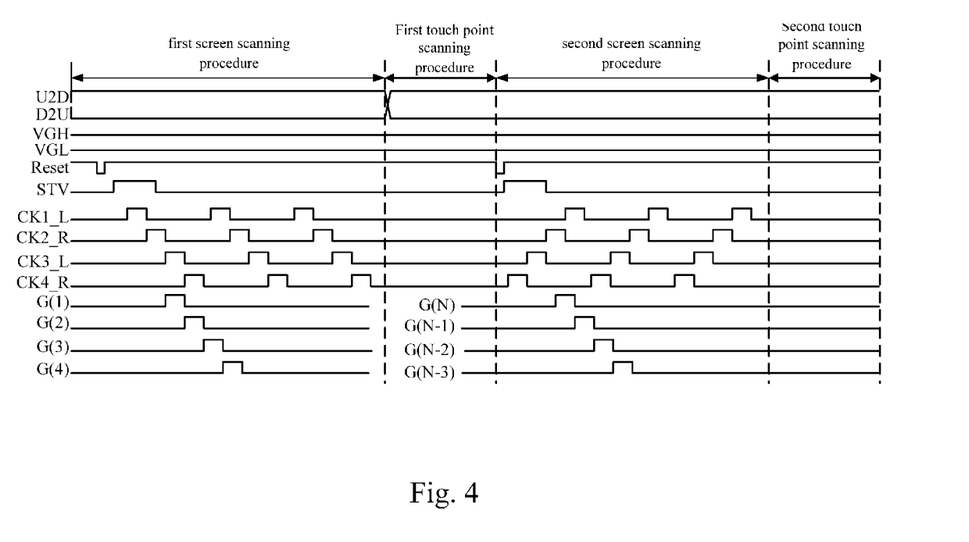
FIG. 4 is a pulse diagram of the liquid crystal display device of the FIG. 3 during actual operation of the GOA circuit.

FIG. 3 is an illustrative drawing of the GOA circuit of the FIG. 1 in a liquid display device. FIG. 4 is a pulse diagram of the liquid crystal display device of the FIG. 3 during actual operation of the GOA circuit. During the operation of the first screen scanning procedure, the GOA circuit scans from the 1st level GOA unit to the 3rd level GOA unit (100). When the GOA circuit receives the touch signal, a touch point scanning procedure is entered. When the reset signal (RESET) is changed to a low potential, the second screen scanning procedure is entered.

The touch point scanning procedure starts when the forward scanning signal (U2D) is changed from a high potential to a low potential and the rearward scanning signal (D2U) is changed from a low potential to a high potential, and ends when the reset signal (RESET) is changed to a low potential. During the touch point scanning procedure, the liquid crystal display device processes a position confirmation procedure for the touch signal. During the second screen scanning procedure, the GOA circuit scans rearward from the (M)th GOA unit (100) to the 5th GOA unit (100), the 4th GOA unit (100) is not scanned. The scanning of the all GOA unit (100) is finished.

Figure 5:
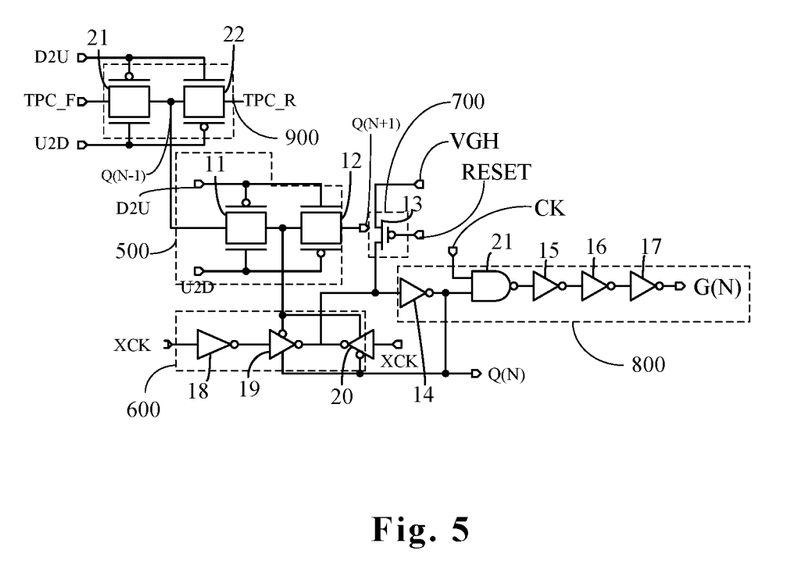
FIG. 5 is a circuit diagram of a GOA circuit according to a second embodiment of the present invention.

FIG. 5 is a circuit diagram of a GOA circuit according to a second embodiment of the present invention. The difference between the second embodiment and the first embodiment is that the GOA unit (100) further comprises a forward-rearward scanning determining circuit (900). The forward-rearward scanning determining circuit (900) is used to receive a rearward scanning signal (D2U), a forward scanning signal (U2D), a touch point forward scanning signal (TPC_F), and a touch point rearward scanning signal (TPC_R).

The forward-rearward scanning determining circuit (900) comprises a third transmission gate (21) and a fourth transmission gate (22). The third transmission gate (21) comprises a first control terminal receiving the rearward scanning signal (D2U), a second control terminal receiving the forward scanning signal (U2D), and an input terminal receiving the touch point forward scanning signal (TPC_F). The fourth transmission gate (22) comprises a first control terminal receiving the forward scanning signal, a second control terminal receiving the rearward scanning signal, an input terminal receiving the touch point rearward scanning signal (TPC_R), and an output terminal connected with an output terminal of the first third transmission gate (21).

The GOA circuit needs to perform the control of the touch point forward scanning signal (TPC_F) and the touch point rearward scanning signal (TPC_R), it is necessary to introduce the forward-rearward scanning determining circuit (900) in order to activate the second screen scanning procedure.

Figure 6:
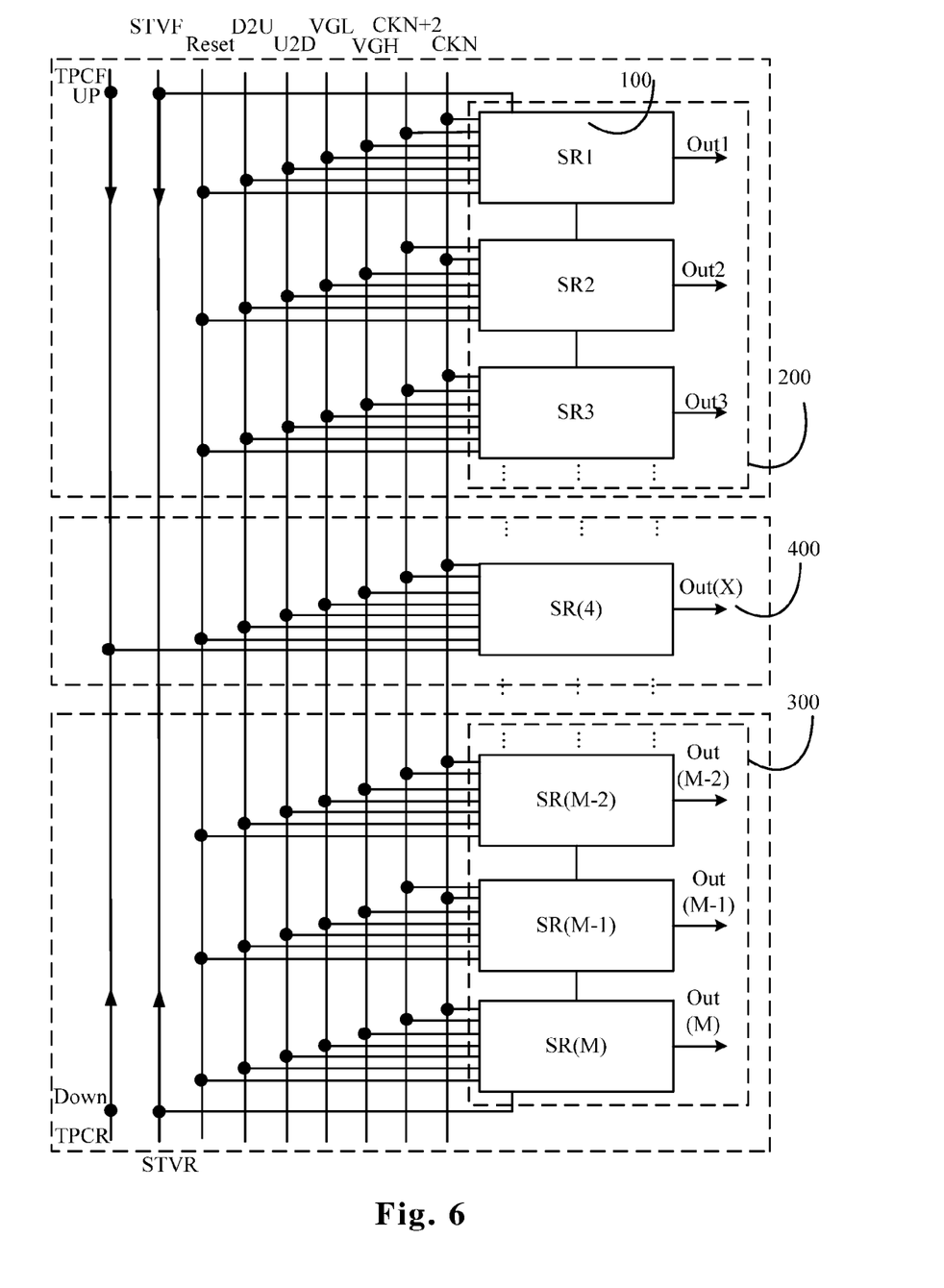
FIG. 6 is an illustrative drawing of the GOA circuit of the FIG. 5 in a liquid display device.
Figure 7:
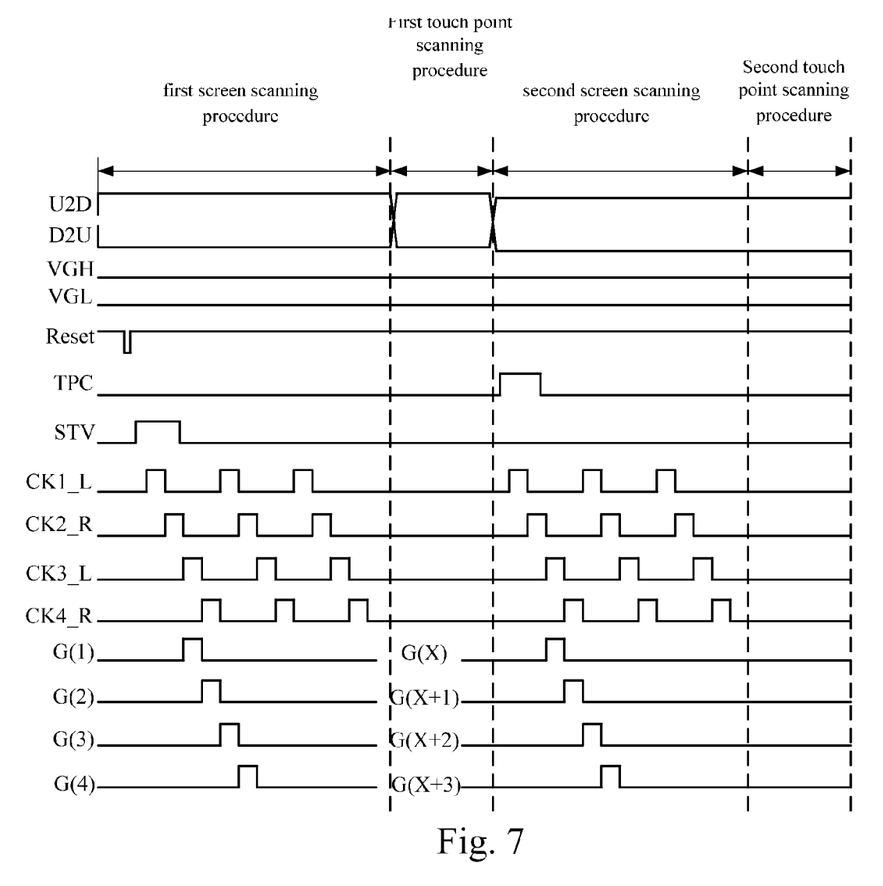
FIG. 7 is a pulse diagram of the liquid crystal display device of the FIG. 5 during actual operation of the GOA circuit.

FIG. 6 is an illustrative drawing of the GOA circuit of the FIG. 5 in a liquid display device. FIG. 7 is a pulse diagram of the liquid crystal display device of the FIG. 5 during actual operation of the GOA circuit.

The difference between the second embodiment and the first embodiment is that the second screen scanning procedure of the second embodiment is forward, not rearward. During the operation of the first screen scanning procedure, the GOA circuit scans forward from the 1st level GOA unit (100) to the 3th level GOA unit (100). When the GOA circuit receives the touch signal, a touch point scanning procedure is entered. When the forward scanning signal (U2D) is changed from a low potential to a high potential and the rearward scanning signal (D2U) is changed from a high potential to a low potential, the second screen scanning procedure is entered.

The touch point scanning procedure starts when the forward scanning signal (U2D) is changed from a high potential to a low potential and the rearward scanning signal (D2U) is changed from a low potential to a high potential, and ends when the forward scanning signal (U2D) is changed back to the high potential and the rearward scanning signal (D2U) is changed back to the low potential. During the touch point scanning procedure, the liquid crystal display device processes a position confirmation procedure for the touch signal.

During the operation of the second screen scanning procedure, the GOA circuit scans forward from the 5th GOA unit (100) to the (M)th GOA unit (100); the 4th GOA unit (100) is not scanned. Then, the scanning of the all of the GOA units (100) is finished. In the embodiment, the GOA circuit is divided into three GOA circuit modules (200, 300, 400), the GOA circuit module 200 is scanned by the first screen scanning procedure. The first screen scanning procedure stops. When the panel scans at the 3th level GOA unit (100), then the touch point scanning procedure starts scanning the driving electrodes. After finishing the touch point scanning procedure, the touch point scanning procedure starts at the 5th level GOA unit (100); the GOA circuit module 300 is scanned by the second screen scanning procedure. This structure is suitable for forward scanning and rearward scanning method.

Although the present invention has been disclosed as preferred embodiments, the foregoing preferred embodiments are not intended to limit the present invention. Those of ordinary skill in the art, without departing from the spirit and scope of the present invention, can make various kinds of modifications and variations to the present invention. Therefore, the scope of the claims of the present invention must be defined.

What is claimed is:

1. A gate on array (GOAL circuit applied to a liquid crystal display device, the liquid display device comprising a plurality of scanning lines, the GOA circuit comprising (M) cascaded GOA units, wherein an (N)th level GOA unit is controlled to charge an (N)th level scanning line accordingly, and the GOA circuit is used to process a first screen scanning procedure and a second screen scanning procedure to detect a touch signal, M being greater than (N+1), the (N)th level GOA unit comprising:

a signal transfer circuit, used to receive a rearward scanning signal and a forward scanning signal, and connected with an (N−1)st gate signal point and an (N+1)st gate signal point;

an inverting amplifier circuit, connected with the signal transfer circuit and an (N)th gate signal point, and used to receive a first clock signal;

a signal reset circuit, connected with the inverting amplifier circuit and a constant high voltage, and used to receive a reset signal; and an inverting logistic circuit, connected with the signal reset circuit, the inverting amplifier circuit, the (N)th gate signal point, and the (N)th level scanning line, wherein, when the first screen scanning procedure is processed, the GOA circuit scans from the 1st level GOA unit to the (X)th level GOA unit, when the GOA circuit receives the touch signal, a touch point scanning procedure is entered, and when the forward scanning signal is changed from a low potential to a high potential and the rearward scanning signal is changed from a high potential to a low potential, the second screen scanning procedure is entered, M, N and X being positive integers, and wherein the inverting amplifier circuit comprises:

a first inverting amplifier, comprising a first input terminal connected with the output terminal of the second transmission gate;

a first inverter, comprising an output terminal connected with a second input terminal of the first inverting amplifier, and an input terminal receiving the first clock signal; and a second inverting amplifier, comprising an output terminal connected with an output terminal of the first inverting amplifier, a first input terminal connected with the output terminal of the second transmission gate, a second input terminal receiving the first clock signal, and a third input terminal connected with a third input terminal of the first inverting amplifier and the (N)th gate signal point.

2. The GOA circuit applied to the liquid crystal display device according to claim 1, wherein the touch point scanning procedure starts when the forward scanning signal is changed from a high potential to a low potential and the rearward scanning signal is changed from a low potential to a high potential, and ends when the forward scanning signal is changed back to the high potential and the rearward scanning signal is changed back to the low potential, and during the touch point scanning procedure, the liquid crystal display device processes a position confirmation procedure for the touch signal.

3. The GOA circuit applied to the liquid crystal display device according to claim 1, wherein during the second screen scanning procedure, the GOA circuit scans rearward from the (M)th GOA unit to the (X+2)nd GOA unit, M being greater than or equal to (X+2).

4. The GOA circuit applied to the liquid crystal display device according to claim 1, wherein the signal reset circuit comprises:

a first thin film transistor (TFT), comprising an output terminal connected with the output terminal of the second inverting amplifier, a control terminal receiving the reset signal, and the input terminal connected with the high constant voltage.

5. The GOA circuit applied to the liquid crystal display device according to claim 4, wherein the inverting logistic circuit comprises:

a second inverter, comprising an input terminal connected with the output terminal of the first TFT, and an output terminal connected with the (N)th gate signal point;

a NAND gate, comprising a first input terminal connected with the output terminal of the second inverter and the (N)th gate signal point, and a second input terminal receiving a second clock signal;

a third inverter, comprising an input terminal connected with an output terminal of the NAND gate;

a fourth inverter, comprising an input terminal connected with an output terminal of the third inverter; and a fifth inverter, comprising an input terminal connected with an output terminal of the fourth inverter, and an output terminal connected with the (N)th level scanning line.

6. The GOA circuit applied to the liquid crystal display device according to claim 5, wherein the first clock signal and the second clock signal are inversed.

7. The GOA circuit applied to the liquid crystal display device according to claim 1, wherein the signal transfer circuit comprises:

a first transmission gate, comprising a first control terminal receiving the rearward scanning signal, a second control terminal receiving the forward scanning signal, and an input terminal receiving a signal from the (N−1)st gate signal point; and a second transmission gate, comprising a first control terminal receiving the forward scanning signal, a second control terminal receiving the rearward scanning signal, an input terminal connected with the (N+1) gate signal point, and an output terminal connected with the output terminal of the first transmission gate.

8. The GOA circuit applied to the liquid crystal display device according to claim 7, wherein the first to the second transmission gates are Complementary Metal Oxide Semiconductor (CMOS).

* * * * *